United States Patent

[11] 3,574,355

| [72] | Inventor | Hans Oetiker<br>Oberdorfstrasse 21, Horgen, Switzerland |
|---|---|---|
| [21] | Appl. No. | 762,076 |
| [22] | Filed | Sept. 24, 1968 |
| [45] | Patented | Apr. 13, 1971 |

[54] HOSE CONNECTION
18 Claims, 4 Drawing Figs.

[52] U.S. Cl. .................................................. 285/39,
285/256, 285/243
[51] Int. Cl. ............................................. F16l 33/20
[50] Field of Search .......................................... 285/243,
256, 39; 285/252, 253, 242, (EH Digest)

[56] References Cited
UNITED STATES PATENTS

| 1,113,080 | 10/1914 | Wilson | 285/243 |
|---|---|---|---|
| 1,386,343 | 8/1921 | Lloyd | 285/243 |
| 1,486,421 | 3/1924 | Dyer | 285/243 |
| 1,876,639 | 9/1932 | Disler et al. | 285/243 |
| 2,280,892 | 4/1942 | Cowles | 285/243 |
| 2,420,617 | 5/1947 | Paquin | 285/243 |
| 2,614,304 | 10/1952 | Oetiker | 285/256X |
| 3,160,428 | 12/1964 | Goodall | 285/256 |
| 3,303,669 | 2/1967 | Oetiker | 285/252 |

FOREIGN PATENTS

| 467,860 | 4/1914 | France | 285/243 |
|---|---|---|---|
| 892,082 | 3/1962 | Great Britain | 285/256 |

*Primary Examiner*—Thomas F. Callaghan
*Attorney*—Craig, Antonelli, Stewart & Hill

ABSTRACT: A hose connection between a nipple and a hose which includes a sleeve having a plurality of axially extending finger portions mounted over the hose and a clamp with one or more folds adapted to be contracted for securely clamping the sleeve onto the hose and thus the hose onto the nipple.

PATENTED APR 13 1971

3,574,355

INVENTOR
HANS OETIKER

BY *Craig & Antonelli*

ATTORNEYS

HOSE CONNECTION

The present invention relates to a hose connection, and more particularly to a high-pressure hose connection between a rubber hose and a relatively fixed nipple.

Hose connections of the aforementioned type are known per se in the prior art. A common type of hose connection used heretofore, for example, in the automotive industry for power steering and the like includes a nipple over which the rubber hose is slipped whereupon a metal sleeve is placed over the outside of the hose so that internal annular projections of the sleeve engage into the surface of the hose when the external surface of the sleeve, which is substantially flat as manufactured, is deformed in a hydraulic tool applying thereto compressing forces to hold fast the hose on the nipple.

This prior art hose connection, however, proved unsatisfactory in operation and entailed numerous disadvantages. In the first place, the sleeve had to be turned or machined from solid stock material. Apart from the cost in manufacturing such a sleeve, the machine tool normally did not provide the necessary accuracy of 1/1,000th of an inch or better as required for high-pressure hose connections. Furthermore, since in particular rubberlike hoses vary in their diametric dimensions, the external surface of the rubber hose had to be ground off heretofore to compensate for inaccuracies in its diametric dimensions and those of the sleeve and to minimize the danger of failure caused by lack of space within the sleeve to accommodate excess volume of the hose. However, this grinding off resulted in partial removal of the best portion of the hose; namely, of the outer surface of the rubber hose. Furthermore, in this prior art device the compressing forces applied to the hose by way of the sleeve could not be accurately controlled in the hydraulic machine as the sleeve itself varied in its wall thickness. Consequently, the assembly operations and resulting quality control were inadequate with such prior art hose connections.

Additionally, the compression of the sleeve in the hydraulic machine frequently lead to longitudinal cracks in the sleeve due to the cold deformation which, in turn, jeopardized the pressure-withstanding capacity of the entire hose connection.

The present invention aims at eliminating the disadvantages encountered in the prior art and essentially consists in clamping a pronglike sleeve member over the hose by means of a hose clamp having deformable ears. The present invention entails several significant advantages. In the first place, it dispenses with the costly and time-consuming machining operations heretofore required to manufacture the sleeve from solid stock and instead provides a sleeve that can be readily and inexpensively mass produced. Additionally, it eliminates the need for grinding off the outer surface of the rubber hose to assure proper fitting. Moreover, the use of a hose clamp provided with ear-shaped folds not only compensates for changes or differences in the outside diameter of the hose but assures a constant pressure force holding the hose onto the nipple.

The various parts involved in the hose connection of the present invention can all be readily made in mass production, involve only slight expenditures and permit ease of assembly without the need for costly tools.

An important feature of the present invention resides in the fact that it automatically compensates for variations in material thicknesses and assures uniform clamping pressure at all times. Additionally, the hose connection of the present invention is also able to accommodate variations in the volume of the rubber by permitting the excess volume to expand into spaces specifically designed therefor.

Accordingly, it is an object of the present invention to provide a hose connection of the aforementioned type which eliminates by simple means the shortcomings and drawbacks encountered in the prior art.

Another object of the present invention resides in a high-pressure hose connection for connecting rubber hoses to relatively fixed nipples which is simple in construction, easy to manufacture and install and involves relatively low costs.

A further object of the present invention resides in a hose connection for high-pressure rubber hoses which automatically compensates for variations in the dimensions of the hose material without any substantial change in the clamping pressure of the connection.

Still a further object of the present invention resides in a hose connection of the type described above which not only offers greater safety at higher pressures but also minimizes the danger of mechanical failure of any of the parts in manufacture and operation.

These and further objects, features, and advantages of the present invention will become more obvious from the following description when taken in connection with the accompanying drawing, which shows, for purposes of illustration only, one embodiment in accordance with the present invention, and wherein.

Figure 1:
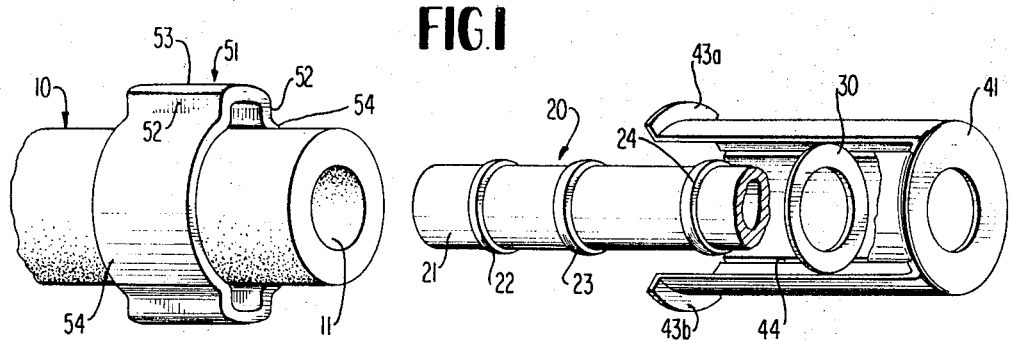
FIG. 1 is a perspective, exploded view of the parts of the hose connection of the present invention.

Referring now to the drawing wherein like reference numerals are used throughout the various views to designate like parts, reference numeral 10 generally designates the hose which is usually made from rubber or rubberlike material and is provided with an internal bore 11 through which flows the hydraulic pressure medium. The hose 10 is intended to be held fast on a nipple generally designated by reference numeral 20 which is normally held fixed or fixedly connected, for example, to a relatively stationary part of the motor vehicle. The nipple includes a nipple portion 21, properly speaking, adapted to be inserted into the bore 11 of the hose. The portion 21 is provided near the free inner, left end thereof with two annular land portions 22 and 23 and to the right thereof, as viewed in FIG. 2 with a diametric collar portion 24 that may be as wide as desired. The nipple portion 21 is adjoined in the direction toward the outer exposed end thereof by a threaded connecting portion 25, for instance, by way of an enlarged portion 26 of appropriate nutlike configuration to permit application of a wrench in the usual manner when effecting a connection at the thread 25 with the fixed part. A disclike member 30 which is provided with a central aperture 31 slightly larger than the external dimension of the nipple portion 21 but smaller than the collar portion 24 is placed over the nipple portion 21, from the right end thereof as viewed in FIG. 2 of the drawing and forms in effect an abutment on opposite sides thereof for the sleeve member generally designated by reference numeral 40, on the one hand, and for the the end of the hose 11. The sleeve member 40 itself consists of a disclike base portion 41 provided with a central bore 42 of larger diametric dimension than the external diameter of the nipple portion 21 and of four fingerlike sleeve portions 42a, 42b, 42c and 42d bent at substantially right angle to the bottom 41 and provided with crimped or bent-over end portions 43a, 43b, 43c and 43d, respectively.

Figure 2:
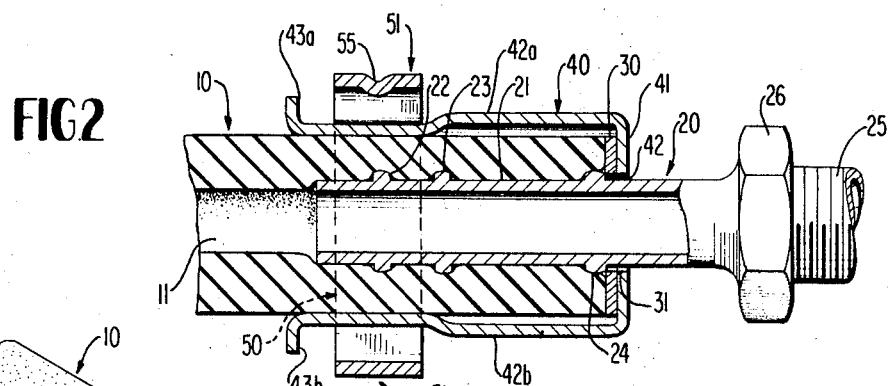
FIG. 2 is an axial cross-sectional view through the hose connection of the present invention as installed on a fixed nipple.
Figure 3:
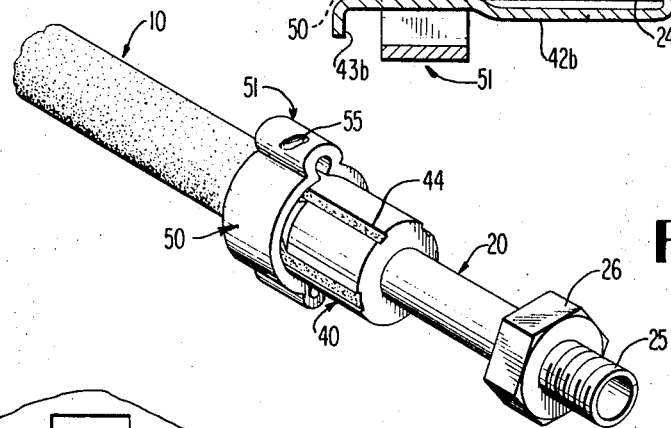
FIG. 3 is a perspective view of the hose connection in accordance with the present invention as installed.

To clamp the sleeve member 40 and more particularly its axially extending pronglike sleeve portions 42a, 42b, 42c and 42d onto the hose 10 to hold the latter immovable on the nipple 20, a clamp generally designated by reference numeral 50 is used which may be, for example, of the type shown and described in my U.S. Pat. No. 2,614,304, i.e., includes two substantially U-shaped fold or lug portions 51, each including outwardly extending leg portions 52 connected by a substantially transversely extending web portion 53 which is provided with a generally circumferentially extending groove 55. The clamping element 50 is illustrated in FIG. 1 in the unclamped condition, i.e., with the fold or lug 51 in its original, substantially U-shape, whereas the clamp 50 is illustrated in FIGS. 2 and 3 in the installed condition i.e., when the fold or lug is deformed by the application of forces at the inner ends of the leg portions 52 to deform the fold 51 into approximately omega shape and to thereby contract the clamp in order to apply the clamping pressure.

The lands 22 and 23 and the collar 24 as well as the connections between the nipple portion 21, the threaded portion 25, and the nut portion 26 may be made in any conventional manner, for example, by cold deformation or the nipple portion 21 may be connected to the nut portion 26, for example, by hard soldering. In the alternative, the nut 26 may be merely placed over the nipple portion from the end opposite lands 22 and 23 whereupon the nipple tube is expanded at its free end into trumpetlike shape by a conventional expanding tool. Prior to the connection of the nipple portion 21 to the nut portion 26, the disc member 30 as well as the sleeve member 41 are placed over the right end of the nipple portion 21 as viewed in the drawing. During assembly, the hose 10 is slipped over the nipple portion 21 in such a manner that it abuts with its hose end against the collar 24 thereby leaving a space of a few millimeters, for example, 2—3 mm., between the hose end and the disc 30. The finger portions 42a to 42d are located along a circumference which has at most a slightly larger diameter than the external diameter of the hose 10. The clamp 50 is thereupon slipped over the sleeve member 40, and more particularly over the finger portions 42a through 42d overlying the lands 21 and 22. The folds 51 are thereupon contracted by means of a hydraulic tool, thereby exerting clamping pressure on the sleeve member 40 and on the hose 10 by the circumferential portions 54 of the clamp 50. Since the folds 51 are closed with predetermined pressure, the pressure exerted by the clamp 50 on the hose 10 and therewith the clamping pressure of the hose 10 on the nipple 21 remains substantially constant as the extent of contraction of the folds 51 with predetermined clamping pressure of the tool automatically compensates for variations in the external dimensions of the hose, without the need for grinding the surfaces thereof.

A hose connection according to the present invention has proved extraordinarily reliable and safe. In actual tests, the hose connection was able to hold perfectly fast when subjected to 1,230,000 impulses of pressure fluctuations from zero to 1,500 p.s.i. When subjected to 32 impulses per minute, the hose connection held fast, but the hose burst at a pressure of 7,980 p.s.i. Obviously, for applications in the automotive industry, such as power steering, the hose connection of the present invention represents a significant advance in the art since it entails greater safety and reliability in operation.

Figure 4:
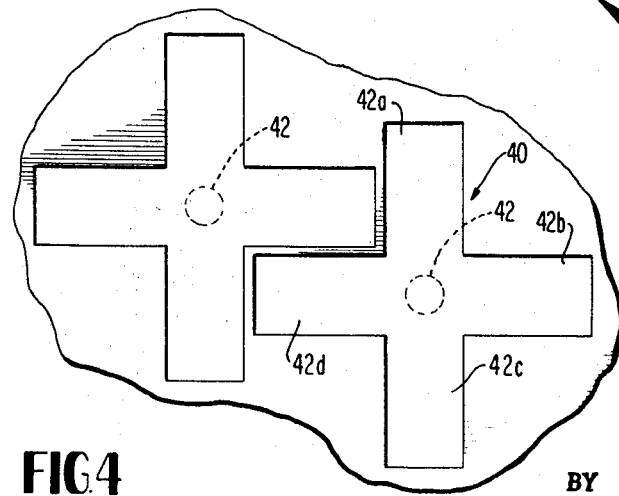
FIG. 4 is a schematic illustrating the advantage of manufacture of certain parts of the present invention.

Furthermore, the various parts can be readily manufactured by mass production techniques. The nipple 20 can be made by cold deformation whereas the sleeve member 40 can be punched out economically with a minimum of waste, from simple sheet metal plate material as shown in FIG. 4, requiring only the bending of the finger portions 42a through 42d and crimping of the end portions 43a through 43d which can be realized by means of simple tools in an economic manner. The central apertures 42 in the sleeve members 40 can be punched out simultaneously during the punching of the substantially cross-shaped matrix for the sleeve member 40.

Changes in volume of the hose material pose no problem for the present invention since excess hose volume is able to escape through the slots 44 between finger portions 42a—42b as well as into the space provided to the rear of the hose end between the latter and the disc 30 into which excess rubber volume may expand over the collar 24.

While I have shown and described only one embodiment in accordance with the present invention, it is understood that the same is not limited thereto but is susceptible of numerous changes and modifications as known to a person skilled in the art. For example, the use of lands 21 and 22 is not necessary as the hose connection of the present invention surprisingly operated satisfactorily under similar pressures and operating conditions even without these lands. Accordingly, I do not wish to be limited to the details shown and described herein but intend to cover all such changes and modifications as are within the scope of those skilled in the art.

I claim:

1. A hose connection for securely clamping a hose onto a nipple to prevent relative axial movement therebetween at high pressures, characterized by a nipple of generally substantially cylindrical configuration having a longitudinal axis, sleeve means positioned on the nipple and having several axially extending finger portions substantially surrounding the circumference of the hose while leaving therebetween only relatively narrow axial slots, and substantially radially contractable clamp means mounted over said finger portions for securely clamping said hose onto said nipple by way of said finger portions, said clamp means having fold means for compensating automatically for changes in the outside diameter of the hose and assuring a substantially constant pressure force holding the hose onto the nipple, and said finger portions extending substantially parallel to the longitudinal axis of the nipple.

2. A hose connection according to claim 1, wherein said clamp means includes fold means having generally outwardly extending leg portions interconnected by a web portion and adapted to be contracted by application of oppositely directed forces at the radially inner ends of said leg portions.

3. A clamp according to claim 2, wherein at least two fold means are provided along the circumference of the clamp means.

4. A hose connection according to claim 3, wherein generally circumferentially extending reinforcing means are provided in the web portion of a respective fold means.

5. A hose connection in which the nipple has an inner end to be covered by the hose and an outer exposed end according to claim 4, further comprising stop means for limiting axial movement of said hose in the direction toward the outer exposed end of the nipple and for limiting axial movement of said sleeve means in the opposite direction.

6. A hose connection according to claim 5, wherein said stop means also effectively provides space for the expansion of excess hose material.

7. A hose connection according to claim 6, wherein said stop means includes collar means on said nipple and disc means between said collar means and the disclike bottom portion of said sleeve means.

8. A hose connection in which the nipple has an inner end to be covered by the hose and an outer exposed end according to claim 1, further comprising stop means for limiting axial movement of said hose in the direction toward the outer exposed end of the nipple and for limiting axial movement of said sleeve means in the opposite direction.

9. A hose connection according to claim 8, wherein said stop means also effectively provides space for the expansion of excess hose material.

10. A hose connection according to claim 9, wherein said sleeve means includes a disclike bottom portion, and said stop means includes collar means on said nipple and disc means separated from said nipple and said sleeve means and between said collar means and the disclike bottom portion of said sleeve means and land means on said nipple between the collar means and the inner end of said nipple.

11. A hose connection according to claim 8, wherein said stop means provides space for the expansion of excess hose material substantially in the axial direction.

12. A hose connection according to claim 8, wherein said sleeve means includes a disclike bottom portion, and said stop means includes collar means on said nipple and disc means separate from said nipple and said sleeve means and disposed between said collar means and the disclike bottom portion of said sleeve means.

13. A hose connection according to claim 1, which includes means to automatically compensate for changes in the volume of the hose material.

14. A hose connection according to claim 1, wherein the dimension of a finger portion in the circumferential direction is several times that of a slot in the circumferential direction.

15. A hose connection according to claim 1, wherein the nipple is provided with an enlarged tool-engaging portion at the end opposite the hose-receiving end, said sleeve means including a disclike bottom portion provided with an aperture larger in diameter than the diameter of said nipple, said finger portions extending from said bottom portion, and said bottom portion being disposed on said nipple intermediate its hose-receiving end and said enlarged tool-engaging portion.

16. A hose connection according to claim 15, wherein said sleeve means essentially consists only of a disclike bottom portion and of said finger portions directly adjoining said bottom portions at substantially right angles.

17. A hose connection according to claim 1, wherein said clamp means has circumferential surface portions in clamping engagement with said finger portions, which extend substantially parallel to the longitudinal axis of the nipple and have a dimension in the axial direction that is considerably shorter than the axial length of the nipple, said circumferential surface portions being in clamping engagement with said finger portions substantially over their entire axial dimension so that said finger portions are radially compressed over the extent of said axial dimension.

18. A hose connection according to claim 1, wherein said sleeve means essentially consists only of a disclike bottom portion and of said finger portions directly adjoining said bottom portion at substantially right angles, the dimensions of each finger portion in the circumferential direction being a multiple the width of a slot in the circumferential direction.